May 17, 1966 C. G. YEDINAK ETAL 3,252,163
RECORD MEMBER ANTI-JAMMING DEVICE FOR INSTRUMENTS
Filed Oct. 9, 1963
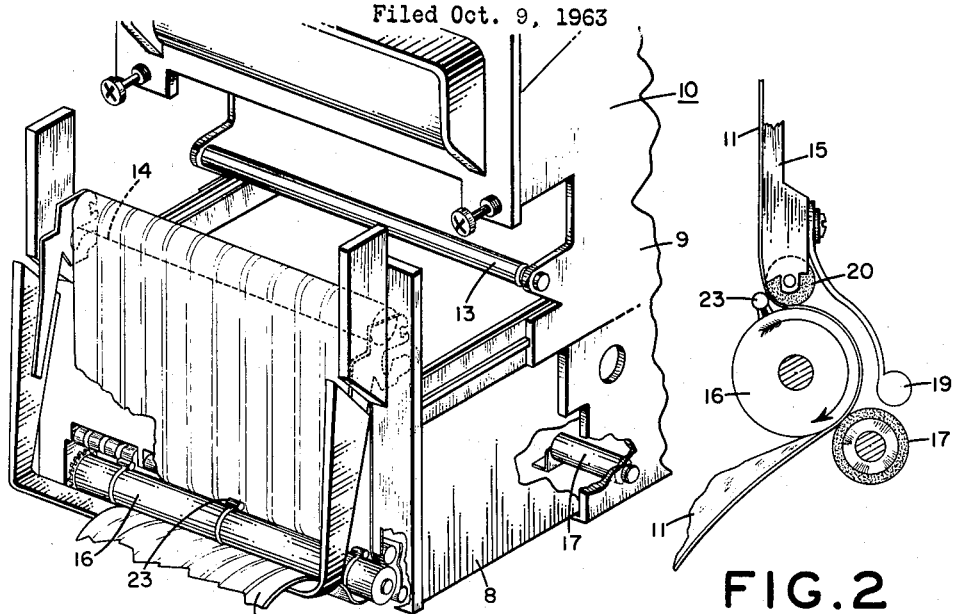
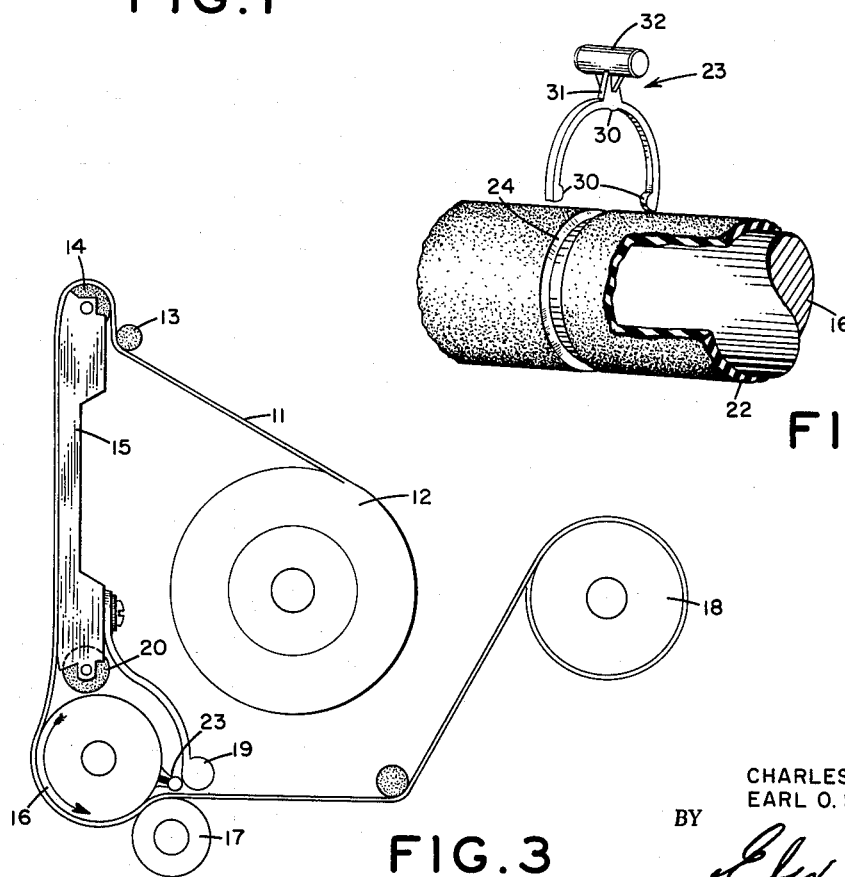
INVENTORS
CHARLES G. YEDINAK
EARL O. SCHWEITZER
BY
*Elvin J. Hyde*
ATTORNEY

United States Patent Office 3,252,163
Patented May 17, 1966

3,252,163
RECORD MEMBER ANTI-JAMMING DEVICE FOR INSTRUMENTS
Charles G. Yedinak, Solon, and Earl O. Schweitzer, Wickliffe, Ohio, assignors to Clevite Corporation, a corporation of Ohio
Filed Oct. 9, 1963, Ser. No. 315,075
11 Claims. (Cl. 346—136)

This invention pertains to an anti-jamming device to prevent record material from jamming between rolls in a recording instrument or the like.

At the present time many different recording instruments use rolls of recording media such as paper, film, electrically conductive paper for spark recorders, etc., some of which may have a surface which tends to adhere to drive rolls and which tends to adhere to itself if it touches itself during the transportation of the paper from the supply roll across a writing face to the take-up roll or the like. The recording medium in its passage through the recording instrument often is caused to pass behind a driving roll or a writing roll surface and if the sticky surface is in engagement with the roll it tends to repeatedly wind around the roll rather than being sent out to a storage bin or the like. This causes severe jamming in the recording instrument.

In the instrument shown in the present application the record chart drive mechanism is so designed that in one mode of operation the record chart passes behind the drive roll and in another mode of operation the record chart passes in front of the drive roll. This causes severe jamming conditions in one of the two modes of operation and to solve the problem an inexpensive easily applied anti-jamming device was devised which automatically prevents the record chart from jamming in the one mode of operation, and which automatically seeks an out-of-the-way position when it is not needed for the other mode of operation.

It is therefore an object of the invention to present an anti-jamming device for instruments utilizing strips of record material which is inexpensive, easy to apply to the instrument, and which will be operative even though the instrument may have several modes of operation.

Another object of the present invention is to provide an anti-jamming device for an instrument using strip chart materal, wherein the anti-jamming device is automatically operative to prevent the chart material from jamming in one mode of operation, and which is automatically operative to seek an out-of-the-way position in another mode of operation of the instrument.

For a better understanding of the present invention, together with other and further objects thereof, reference is had to the following description taken in connection with the accompanying drawings, and its scope will be pointed out in the appended claims.

An aspect of the present invention lies in the provision of an anti-jamming and roller assembly toward and away from which a sheet-like record medium moves. The roller assembly comprises an elongated rotatable drive roller having an arcuate section of its circumferential surface normally engaged by a moving sheet-like record medium as the medium moves toward and away from the roller assembly. An anti-jamming means is rotatably mounted on the roller for rotary movement relative thereto, and it has a portion extending outward from the circumference of the roller to maintain separation between segments of the medium moving toward and away from the roller to prevent segments of the record medium from rolling up on the roller.

FIGURE 1 of the drawings is an isometric view, partially broken away, showing portions of an instrument which uses a strip of record material.

FIGURE 2 is a side view of a portion of the instrument showing a strip of record material as it moves in one mode of operation through the machine and is ejected from the front of the machine.

FIGURE 3 is a side view of the instrument showing the path of the paper through the machine as it moves in another mode of operation from a supply roll to a take-up roll which is inside the instrument.

FIGURE 4 is an isometric view partially broken away showing the roller assembly and showing the anti-jamming device about to be inserted in a circumferential groove in the roller.

With reference to the drawings there is shown in FIGURE 1 an instrument 10 for recording on a moving chart of record material 11. The particular recording mechanism is not shown but it is to be understood that it might be a pen recorder, a photographic recorder, or a heat or pressure writing instrument. The particular recording method forms no part of the present application.

The instrument comprises a fixed main portion 9 and a drawer portion 8 which can slide in and out of the fixed portion 9. As shown in FIGURE 1 the drawer is in its outward position. Within the fixed main portion 8 there is mounted a supply roll 12 of the record material 11, and the record material extends from the supply roll 12, over a tension roll 14, down across the face of the instrument where recording takes place (the details of which are not shown), and either in front of the drive roller 16 or behind the drive roller 16, depending upon which mode of operation is selected.

As shown in FIGURE 3 the record material 11 is unwound from the supply roll 12 and passes under a guide roller 13 and then up around the tension roller 14 which is mounted in a frame 15. The guide roller 13 serves to assure a sufficient angle of wrap of the record material 11 around the tension roller 14. From the tension roller 14 the record material moves past the face of the instrument and around the outside of drive roller 16, over a friction roller 17 and back into the machine where it is taken up on the take-up spindle 18 which is driven along with the drive roller 16 by motor means not shown.

A plurality of anti-jamming devices 23 are mounted in grooves 24 in the drive roller 16, as shown in FIGURES 1 and 2.

In this mode of operation where the record material passes behind the drive roller 16 the record material is ejected from the front of the instrument and may fall on the floor or the engineer may tear the record off. A record chute 19 is connected to the frame 15 and extends rearwardly into the machine. As the record material is threaded between the drive roller 16 and a series of edge rollers 20 the chute 19 deflects the record material downwardly so that it comes out betwen the drive roller 16 and the friction roller 17. In this mode of operation, without the anti-jamming device of this invention, the surface of the record material 11 which is against the rubber covered drive roller 16 is prone to adhere to it, in which event it rides around the roller and jams between the downwardly moving portion of the record material and the roller 16.

To prevent this jamming a plurality of the anti-jamming devices 23 are mounted in a plurality of grooves 24 in the rubber covering 22 on the roller 16, as shown in FIGURE 1. In this mode of operation, as shown in FIGURE 2, the anti-jamming devices rotate with the roller 16 in a clockwise direction until they abut against the record material 11 at the location of the edge rollers 20. The anti-jamming devices 23 stop in this position, and thereafter the roller 16 rotates in respect to the anti-jamming devices. If the record material tends to adhere to the roller 16 it will be separated therefrom by the anti-jamming devices 23 which prevent the material 11 from passing a second time between roller 16 and the edge rollers 20.

As shown in FIGURE 4 the roller 16 is covered by a rubber surface 22 and the grooves 24 extend through the rubber down to the surface of the roller 16. Each of the anti-jamming devices 23 is somewhat wishbone in shape, and preferably they are made of plastic such as nylon or the like. The width of the groove 24 and the width of the two legs forming the wishbone-like anti-jamming member 23 are such that the groove is slightly smaller, thereby imparting to the member 23 light frictional forces which cause it to rotate as the roller 16 rotates. A radially extending portion 31 connects an axially extending portion 32 to the legs of the device 23, and inward projections 30 serve to engage the smooth surface of the roller 16. The projections 30 serve as wiping means to keep the cylindrical surface clean and assure that the device 23 does not grab onto the roller 16.

In the mode of operation shown in FIGURE 3 there is no appreciable tendency for the record material 11 to adhere to the drive roller 16 since the take-up spindle 18 is driven and exerts a positive pull on the record material. In this mode the drive roller 16 rotates in a counter-clockwise direction, causing, through the slight frictional engagement between roller 16 and the anti-jamming device, the device 23 to be biased against the paper chute 19 where it is out of the way.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

It is claimed and desired to secure by Letters Patent of the United States:

1. In a roller assembly toward and away from which a sheet-like medium moves, the combination comprising: an elongated rotatable drive roller of a given diameter having an arcuate section of its circumferential surface normally engaged by said moving sheet-like medium as said medium moves toward and away from said roller assembly, anti-jamming ring means having a diameter no greater than the diameter of said drive roller rotatably mounted on said roller for rotary movement relative thereto and having a portion extending outward from the circumference of said roller to maintain separation between segments of the medium moving toward and away from said roller and to prevent winding of said segments on said roller.

2. In a roller assembly toward and away from which a sheet-like medium moves, the combination comprising: an elongated rotatable drive roller of a given diameter for engaging and position said moving sheet-like medium, an annular recess in the circumferential surface of said guide roller, anti-jamming ring means having a diameter no greater than the diameter of said drive roller slidably received in said recess for rotatable movement relative to said roller; said anti-jamming means having a medium guide portion extending beyond the circumference of said roller to maintain separation between segments of the sheet-like medium moving toward and away from said roller and to prevent jamming of one of said segments on said roller.

3. In a roller assembly as claimed in claim 2 wherein said anti-jamming means comprises a ring of depth not greater than the depth of said annular recess; said guide portion of said anti-jamming means being integrally formed with said ring.

4. In a roller assembly toward and away from which a sheet-like record medium moves, the combination comprising: an elongated roller adapted selectively to rotate clockwise or counterclockwise and positioned to have a record medium adapted selectively to engage different circumferential portions thereof depending on the selected direction of rotation, an annular recess of predetermined depth in the circumferential surface of said roller; a circular ring having a depth not greater than the depth of said recess positioned in said recess for rotational movement relative to said roller; an integral arm extending from said ring; and an integral medium guide member formed on the extending end of said arm to maintain separation between segments of the medium moving toward and away from said roller and to prevent winding of said segments on said roller; said ring being rotatable to selective angular locations depending on the selected direction of rotation of said roller.

5. In a roller assembly as claimed in claim 4 wherein said ring and recess are sized to provide a slight frictional retaining force therebetween to cause rotation of said ring with said roller until said guide member engages the medium segment moving toward said roller; said frictional retaining force being of a magnitude to permit relative frictonal slippage of said ring and roller after said engagement.

6. In a roller assembly as claimed in claim 5 wherein said ring is flexible and is of non-continuous circumference defining an opening to facilitate installation of said ring on said roller.

7. In a roller assembly as claimed in claim 6 wherein the size of the opening is slightly less than the diameter of said recess to enable said ring to be forced into said recesses and retained therein.

8. In a roller assembly for a recorder having a moving record medium the combination comprising: an elongated drive roller of a given diameter rotatably mounted within the recorder to have an arcuate section of its circumferential surface engaged by the record medium and to have another arcuate section which is not engaged by the record medium, a plurality of axially spaced annular recesses in the circumferential surface of said roller; a partial ring of compliant material having a diameter no greater than the diameter of said drive roller positioned in each of said recesses to be contained thereby; each of said rings having a guide member having medium-engaging surfaces extending outward from the circumferential surface of said roller at the location of the arcuate section which is free of engagement by said medium to maintain separation between segments of the medium moving toward and away from said roller and to prevent winding of said segments on said roller.

9. A roller assembly as claimed in claim 8 wherein said rings and guide members are formed integrally from plastic material.

10. A record chart anti-jamming device for insertion in an annular recess in a chart roller of a recorder comprising: a partial ring of compliant material defining an opening whose size is less than the diameter of the bottom of the recess, said ring having an integral chart engaging portion extending outwardly from said ring, the diameter of said ring being no greater than the diameter of said chart roller.

11. A record chart anti-jamming device as claimed in claim 10 wherein said ring is of a depth less than the depth of the recess in said chart roller and is formed from plastic material.

References Cited by the Examiner

UNITED STATES PATENTS

| | | | |
|---|---|---|---|
| 551,257 | 12/1895 | Brown et al. | 83—114 X |
| 2,178,386 | 4/1916 | Edwards | 83—114 |
| 2,329,056 | 9/1943 | Keller | 83—114 |
| 3,042,281 | 7/1962 | Balvin et al. | 226—191 X |

LEO SMILOW, *Primary Examiner.*

J. W. HARTARY, *Assistant Examiner.*